US011029745B2

(12) United States Patent
Ernewein et al.

(10) Patent No.: US 11,029,745 B2
(45) Date of Patent: Jun. 8, 2021

(54) SYSTEMS AND METHODS FOR CONTROLLING INSTANTANEOUS CURRENT CHANGES IN PARALLEL PROCESSORS

(71) Applicant: QUALCOMM INCORPORATED, San Diego, CA (US)

(72) Inventors: Kyle Ernewein, Toronto (CA); Jason Edward Podaima, Richmond Hill (CA); Francisco Perez, San Diego, CA (US); John Daniels, San Diego, CA (US); Alex Miler, Toronto (CA); Jeffrey Gemar, San Diego, CA (US); Rexford Alan Hill, San Diego, CA (US); Haoping Xu, North York (CA)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 16/184,934

(22) Filed: Nov. 8, 2018

(65) Prior Publication Data
US 2020/0073470 A1    Mar. 5, 2020

Related U.S. Application Data

(60) Provisional application No. 62/726,007, filed on Aug. 31, 2018.

(51) Int. Cl.
*G06F 1/32* (2019.01)
*G06F 1/324* (2019.01)
*G06F 1/3228* (2019.01)

(52) U.S. Cl.
CPC ............ *G06F 1/324* (2013.01); *G06F 1/3228* (2013.01)

(58) Field of Classification Search
CPC ....... G06F 1/324; G06F 1/3206; G06F 1/3228
See application file for complete search history.

(56) References Cited

U.S. PATENT DOCUMENTS

| 6,304,978 | B1* | 10/2001 | Horigan | ................... G06F 1/26 |
| | | | | 713/322 |
| 9,557,795 | B1* | 1/2017 | Sabih | ..................... G06F 9/5094 |
| 2018/0189649 | A1* | 7/2018 | Narayan | .................. G06N 3/08 |

* cited by examiner

*Primary Examiner* — Stefan Stoynov
(74) *Attorney, Agent, or Firm* — Qualcomm Incorporated

(57) ABSTRACT

Systems and methods are disclosed method for controlling instantaneous current changes in parallel processors with arrays of parallel computing elements, such as neural processors. An exemplary method comprises monitoring the array of computing elements and determining a transition from a first activity level of the array to a second activity level of the array, such as an idle-to-active or active-to-idle transition. Once a transition is determined, the array is selectively controlled to minimize the instantaneous current change from the transition from the first activity level to the second activity level.

21 Claims, 13 Drawing Sheets

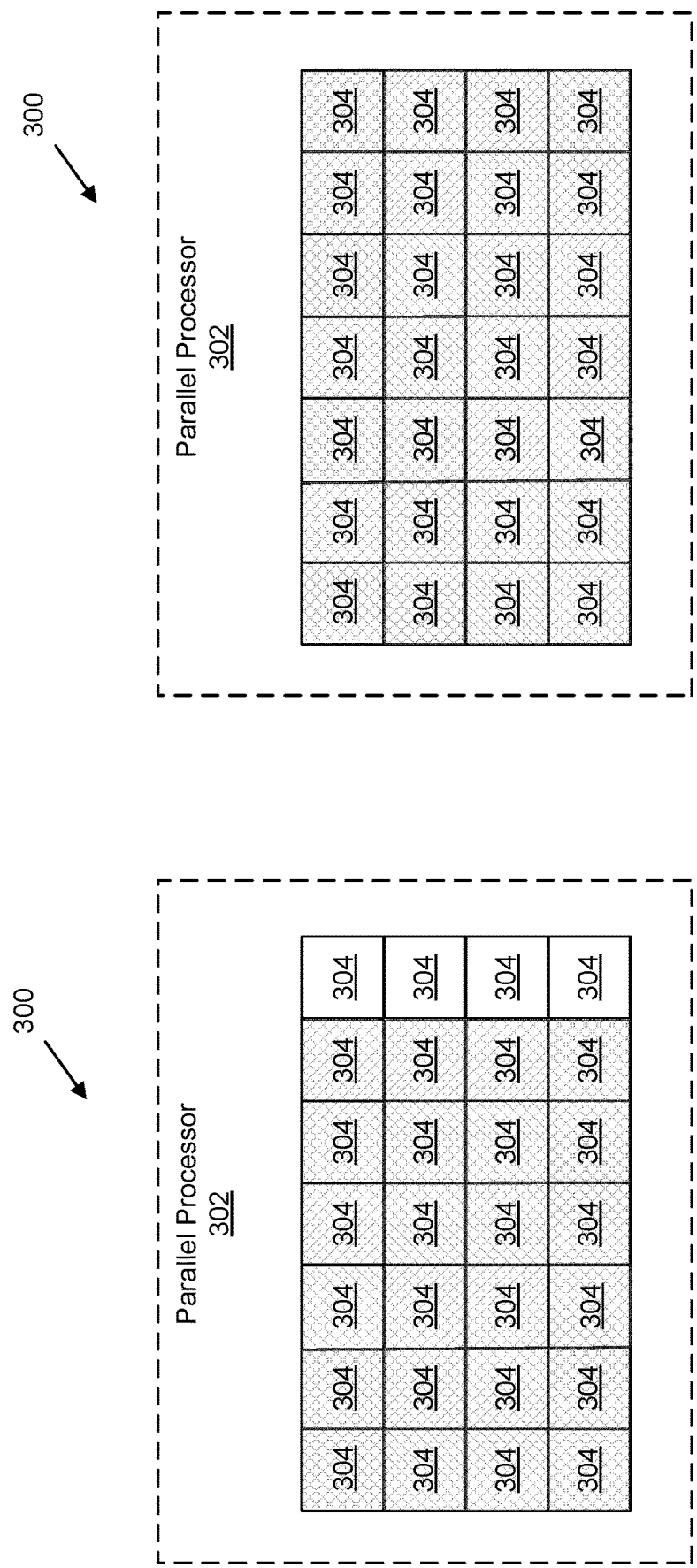

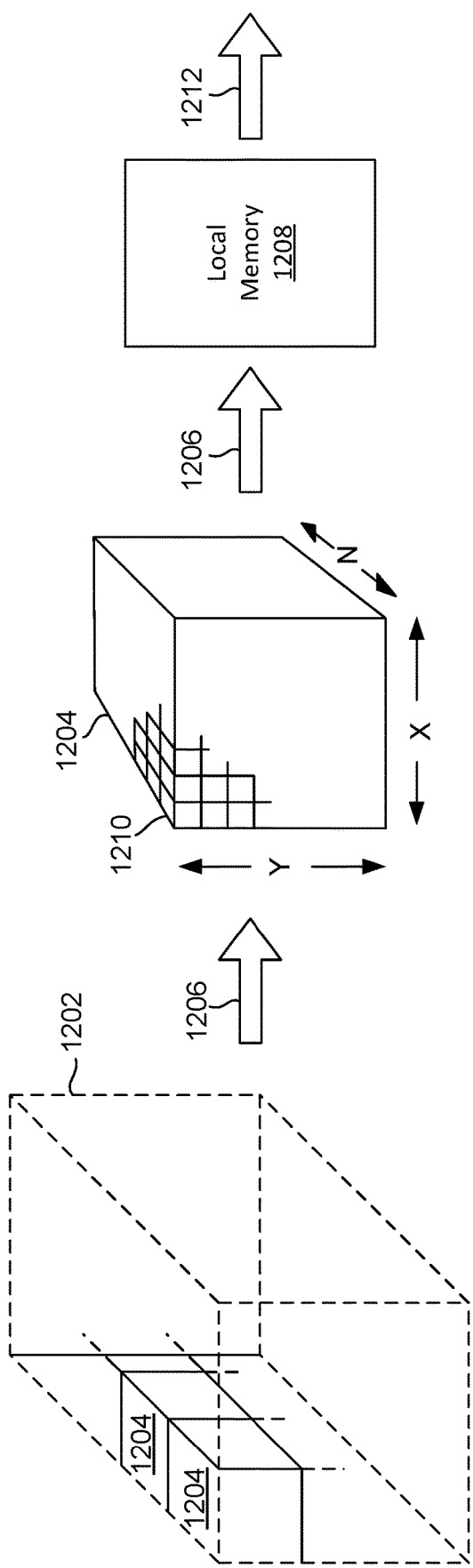

SYSTEMS AND METHODS FOR CONTROLLING INSTANTANEOUS CURRENT CHANGES IN PARALLEL PROCESSORS

CROSS-REFERENCE TO RELATED APPLICATIONS

The benefit of and priority to U.S. Provisional Patent Application No. 62/726,007, filed Aug. 31, 2018, entitled "SYSTEMS AND METHODS FOR CONTROLLING INSTANTANEOUS CURRENT CHANGES IN PARALLEL PROCESSORS," is hereby claimed, and the contents thereof incorporated herein by this reference in their entirety as if fully set forth below and for all applicable purposes.

DESCRIPTION OF THE RELATED ART

Computing devices comprising at least one processor coupled to a memory are ubiquitous. Computing devices may include servers, desktop computers, laptop computers, portable digital assistants (PDAs), portable game consoles, tablet computers, cellular telephones, smart phones, and wearable computers. In order to meet the ever-increasing processing demands of users, computing devices may implement parallel processors, such as neural processors, that include multiple identical computing elements in an array such that the computing elements are able to independently execute operations on inputs or operands in parallel. The term "operand" typically refers to data provided to an array as an atomic unit in a single processing cycle.

Such parallel operation of the computing elements can consume large amounts of power, and it is desirable to only activate the array/computing elements when needed. For example, as illustrated in FIG. 1, a parallel processor 102, which may be a neural processor, comprises an array of parallel computing elements 104, each computing element 104 able to independently operate on operands and to provide an output. The left-hand portion of FIG. 1 shows the computing elements 104 in an idle state, while the right-hand portion of FIG. 1 shows the computing elements in an active state (illustrated by the cross-hatching in computing elements 104) when provided with operands (illustrated by the arrow).

As will be understood, the current draw of such an array of parallel computing elements 104 in an active state differs greatly from the current draw of the computing elements 104 in an idle state. As a result, activating the array from idle as illustrated in FIG. 1, or idling the array from an active status, leads to large instantaneous changes in current ($\Delta i/\Delta t$). Such large $\Delta i/\Delta t$ can cause voltage spikes or droops or other events that lead to performance loss or even functional failure of the processor. Prior methods to address these instantaneous current changes in parallel processors typically include over-engineering the processor package and/or power grid with on-die capacitance. Such methods result in increased manufacturing cost and/or difficulty for the parallel processor.

Accordingly, there is a need for improved systems and methods to control instantaneous current changes in parallel processors.

SUMMARY OF THE DISCLOSURE

Apparatuses, systems, methods, and computer programs are disclosed for controlling instantaneous current changes in parallel processors with arrays of computing elements, such as neural processors. An exemplary method comprises monitoring the array of computing elements and determining a transition from a first activity level of the array to a second activity level of the array, such as an idle-to-active or active-to-idle transition. Once a transition is determined, the array is selectively controlled, such as by incrementally controlling the frequency of a core clock of the processor and/or by incrementally controlling the activity level of portions of the array, to minimize the instantaneous current change from the transition from the first activity level to the second activity level.

In another embodiment, an exemplary system comprises an array of computing elements of a parallel processor such as a neural processor. The computing elements are configured to operate independently of each other in parallel. The system also includes logic configured to determine a transition from a first activity level of the array to a second activity level of the array. The exemplary system further comprises a controller configured to control the array, such as by incrementally controlling the frequency of a core clock of the processor and/or by incrementally controlling the activity level of portions of the array, to minimize the instantaneous current change from the transition if the array from the first activity level to the second activity level.

Other systems, methods, and computer programs for controlling instantaneous current changes in parallel processors, and additional aspects of the same, will be appreciated in view of the detailed description below.

BRIEF DESCRIPTION OF THE DRAWINGS

In the Figures, like reference numerals refer to like parts throughout the various views unless otherwise indicated. For reference numerals with letter character designations such as "102a" or "102a", the letter character designations may differentiate two like parts or elements present in the same Figure. Letter character designations for reference numerals may be omitted when it is intended that a reference numeral to encompass all parts having the same reference numeral in all Figures.

FIG. 3C is similar to FIGS. 3A-B, showing a still further portion of the computing elements in an active state;

FIG. 3D is similar to FIGS. 3A-3C, showing all of the computing elements in an active state.

FIG. 12A illustrates a method for predicting a transition of an array of computing elements from an active state to an idle state.

FIG. 12B illustrates nested-loop logic of the method of FIG. 12A.

DETAILED DESCRIPTION

Figure 1:
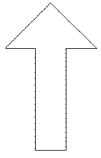
FIG. 1 illustrates a prior art parallel processor transitioning from an idle state to an active state.

The word "exemplary" is used herein to mean "serving as an example, instance, or illustration." Any aspect described herein as "exemplary" is not necessarily to be construed as preferred or advantageous over other aspects.

In this description, the term "application" or "image" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application miming on a computing device and the computing device may be a component.

One or mare components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the term "computing device" is used to mean any device implementing a processor (whether analog or digital) in communication with a memory, such as a desktop computer, gaming console, or server. A "computing device" may also be a "portable computing device" (PCD), such as a laptop computer, handheld computer, or tablet computer. The terms PCD, "communication device," "wireless device," "wireless telephone", "wireless communication device," and "wireless handset" are used interchangeably herein. With the advent of third generation ("3G") wireless technology, fourth generation ("4G"), Long-Term Evolution (LTE), etc., greater bandwidth availability has enabled more portable computing devices with a greater variety of wireless capabilities. Therefore, a portable computing device may also include a cellular telephone, a pager, a smartphone, a navigation device, a personal digital assistant (PDA), a portable gaming console, a wearable computer, or any portable computing device with a wireless connection or link.

As discussed, computing devices may implement parallel processors, such as neural processors, that include multiple computing elements configured in an array such that the computing elements are able to independently execute operations on inputs or operands in parallel. Such parallel processors may be implemented in high-performance embedded systems and/or may be used for hardware acceleration, video compression, image processing, medical imaging, network processing, or other compute-intensive applications.

The parallel operation of the computing elements can consume large amounts of power, and it is desirable to only activate or provide current to the array/computing elements when needed. However, the current draw of such computing elements operating in parallel in an active state differs greatly from the current draw of the computing elements in an idle state. As a result, activating the array/computing elements from idle, or idling the array from an active status, leads to large instantaneous changes in current ($\Delta i/\Delta t$) which are desirable to control in order to avoid performance loss or functional failure of the processor.

Figure 2:
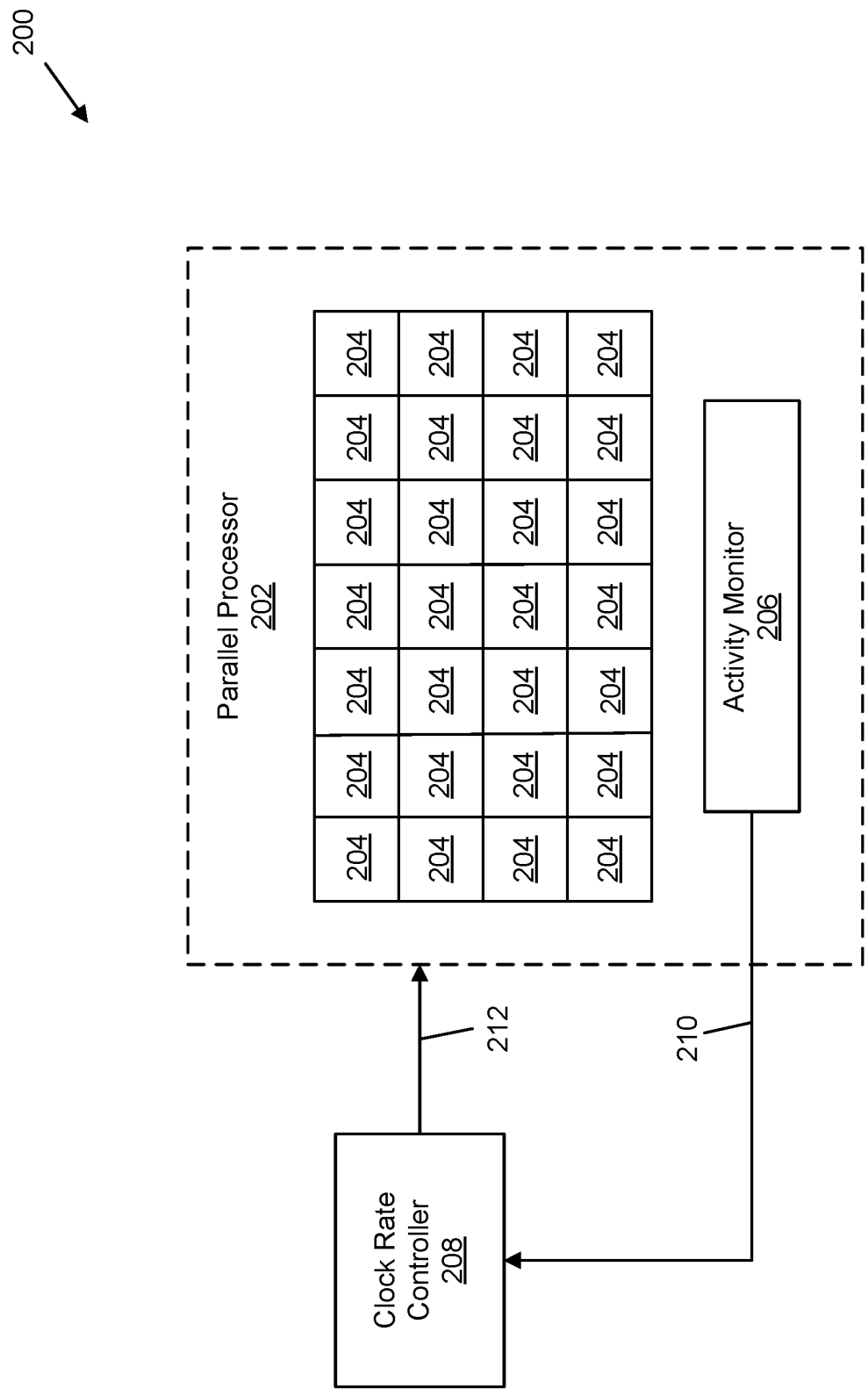
FIG. 2 is a block diagram of an embodiment of a system that allows for controlling instantaneous current changes in a parallel processor.

FIG. 2 illustrates block diagram an embodiment of a system 200 that allows for controlling $\Delta i/\Delta t$ in a parallel processor 202, especially when transitioning from an idle-to-active state or an active-to-idle state. As will be appreciated, the embodiment of the system 200 controls or limits $\Delta i/\Delta t$ by modulating clock frequency of the processor 202 which has the advantage of being almost transparent to the processor 202 and/or allows implementation without affecting the architecture of the compute array of the processor 202.

As illustrated in FIG. 2, parallel processor 202 includes an array of computing elements 204 configured to operate in parallel. Processor 202 may in an embodiment be a neural processor, implemented as an integrated circuit. As will be understood the array of computing elements 204 in FIG. 2 is illustrative, and processor 202 may contain more computing elements 204 than showing in FIG. 2, including hundreds or thousands of computing elements 204 in parallel (commonly referred to as "massively parallel"). Computing elements 204 may all be identical, although identical computing elements 204 are not required. Computing elements 204 may be any desired type of processing component such as a digital signal processor.

The illustrated processor 202 also includes an activity monitor 206 configured to determine or predict when the processor 202 and/or array of computing elements 204 will transition from an idle state to an active state, from an active state to an idle state, or any other state transitions for which it is desirable to control or limit $\Delta i/\Delta t$.

Activity monitor 206 may be a separate component of processor 202 in some embodiments. In other embodiments, activity monitor 206 may comprise an already-existing component of processor 202 with additional logic to allow prediction of the state transitions of the array. In an embodiment, activity monitor 206 may monitor the activity of the array of computing elements 204 to predict upcoming state transitions, such as by monitoring first-in-first-out (FIFO) fill levels in one or more buffers in communication with the array of computing elements 204 (e.g. input buffers or output buffers). An example of such an implementation is described below with regard to FIG. 11.

Additionally, although FIG. 2 illustrates a two-dimensional array of computing elements 204 receiving a two-dimensional volume of operands for clarity, it will be understood that in other embodiments the array of computing elements 204 may be three-dimensional and/or that array may receive three-dimensional input operands (and three-dimensional output of results from the computing elements 204 of the array). The system 200 and operation of the system 200 discussed herein are equally applicable to such three-dimensional arrays and three-dimensional operands. An example of such an implementation is described below with regard to FIGS. 12A-12B.

In yet other embodiments, the activity monitor 206 may instead, or additionally, rely on other information to predict state transitions for the processor 202 and/or the array of computing elements 204. For example, a handshake process or signal between the processor 202 and an application (or another component) may be used to predict a transition from an idle state to an active state. For another example, information from an application or other component that blocks of data will be coming to the processor 202 (or that blocks of data will not be coming or are missing) may also be used to predict a transition from an idle state to an active state (or a transition from an active state to an idle state). As will be understood, other information may also be used by the activity monitor 206 to predict state transitions of the array of computing elements 204.

In the illustrated system 200, activity monitor 206 is in communication with a clock rate controller 208, which in turn is in communication with the core clock of processor 202. In an embodiment, clock rate controller 208 may be implemented as a state machine. Although illustrated as being "outside" of or separated from processor 202 in FIG. 2, in other embodiments (not illustrated), clock rate controller 208 may be part of processor 202. Similarly, activity monitor 206 and clock rate controller 208 are illustrated in FIG. 2 as separate components in FIG. 2, while in other embodiments (not illustrated) activity monitor 206 and clock rate controller 208 may comprise a single component and/or clock rate controller 208 may be part of activity monitor 206. Regardless of how implemented, clock rate controller 208 operates to modulate the frequency of the core clock of processor 202. In the illustrated embodiment, in response to control signals 210 or information from activity monitor 206, clock rate controller 208 operates to modulate or change the frequency of the core clock, such as with signals 212.

Increasing the frequency of the processor 202 core clock increases the current (i) consumed by the array of computing elements 204. By incrementally increasing the core clock frequency (based on the prediction of a transition from an idle state to an active state) to a frequency suitable for optimal operation of the computing elements 204, $\Delta i/\Delta t$ can be managed or controlled to allow transition to an active state without detrimental impact (and without the need for over engineered packages or power grids). Conversely, by incrementally decreasing the core clock frequency (based on the prediction of a transition from an active state to an idle state) to an idle frequency, $\Delta i/\Delta t$ can again be managed or controlled to allow the transition without causing harm.

The determination whether the clock frequency should be increased or reduced may be made by either activity monitor 206 or clock rate controller 208 in different embodiments. In one embodiment, activity monitor 206 makes the determination and the control signal 210 from activity monitor 206 to clock rate controller 208 may simply be an "increase" or "decrease" signal. In other embodiments, activity monitor 206 makes the determination, and the control signal 210 from activity monitor 206 to clock rate controller 208 may instead, or additionally, provide an amount to increase or decrease the clock frequency. For such embodiments, the activity monitor 206 may determine both whether to increase/decrease the clock frequency as well as the amount of frequency increase/decrease.

Clock rate controller 208 operates to incrementally increase/decrease the frequency of the core clock, such as with stepped increases/decreases to a target frequency at a specified time, to control $\Delta i/\Delta t$. In an embodiment, clock rate controller 208 may determine the size or number of "steps" for the incremental increase/decrease based on information provided in control signal 210 from activity monitor 206. In other embodiments, activity monitor 206 may determine the size or number of "steps" for the incremental increase/decrease and provide that information to clock rate controller 208 as part of the control signal 210.

Figure 6:
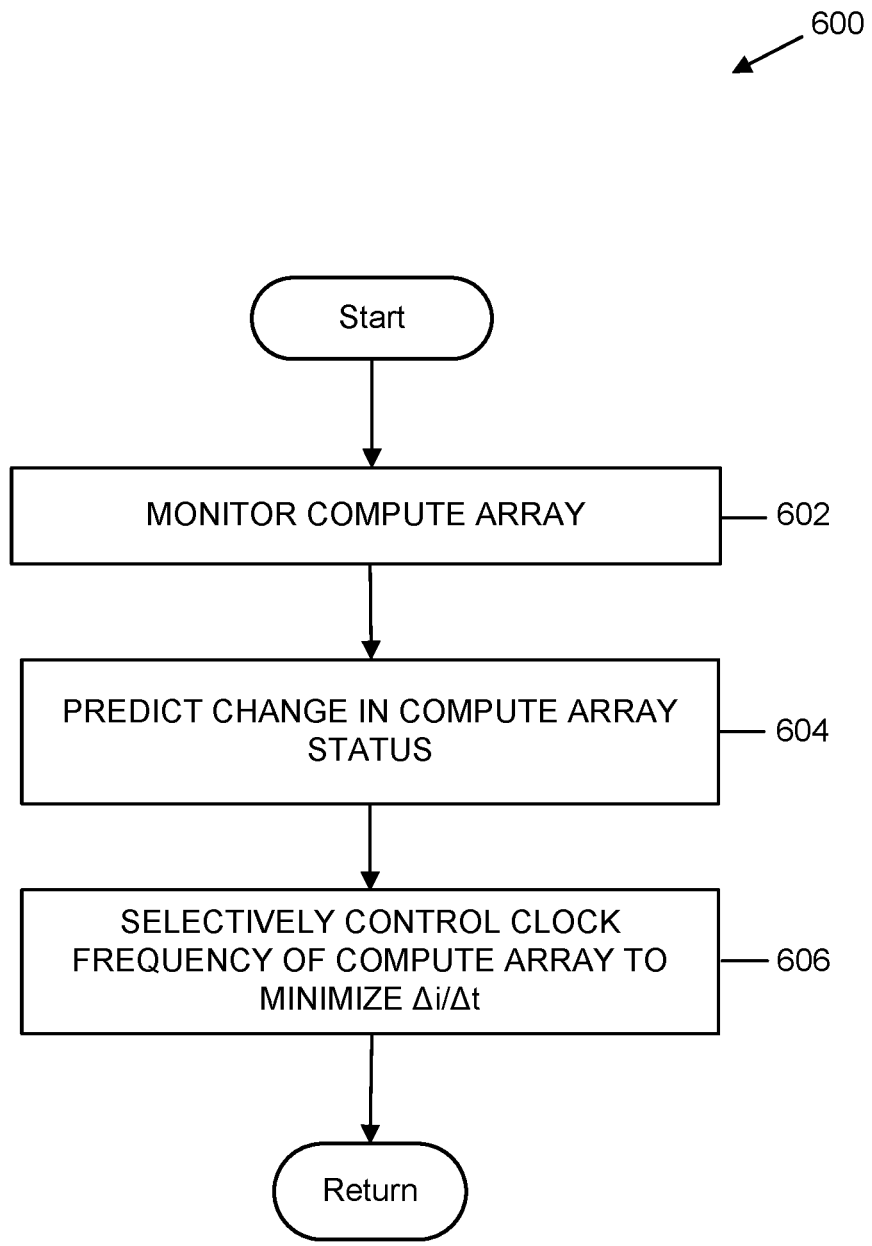
FIG. 6 is a flowchart illustrating an exemplary method for controlling instantaneous current changes in a parallel processor.
Figure 7:
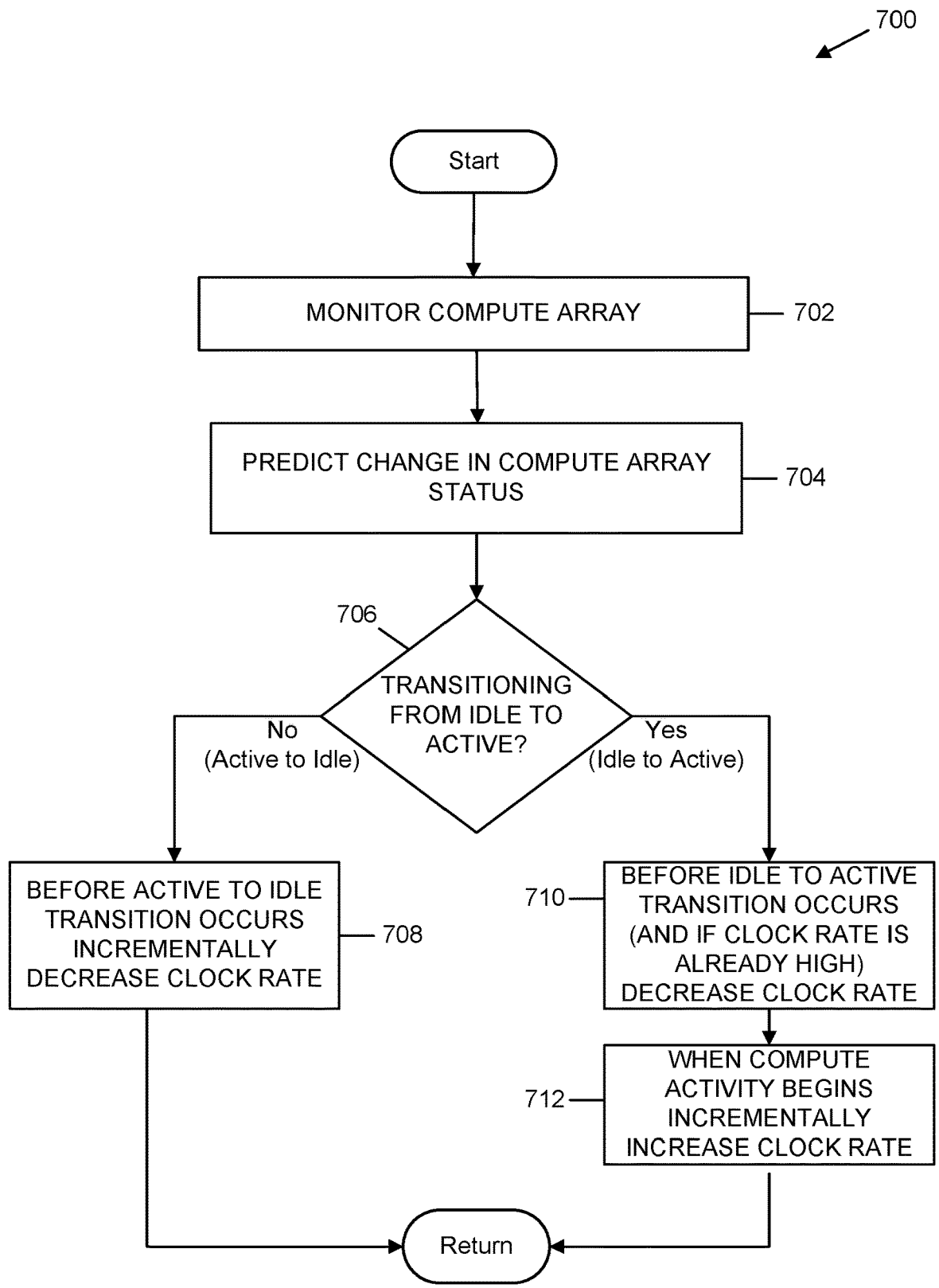
FIG. 7 is a flowchart illustrating exemplary steps that may be performed to implement aspects of the method of FIG. 6.

Turning to FIG. 6, an exemplary method 600 for controlling instantaneous current changes in a parallel processor is illustrated. Method 600 of FIG. 6 may be executed by the system 200 of FIG. 1, in block 602 a compute array is monitored, such as by activity monitor 206 monitoring the array of computing elements 204 and/or processor 202. In block 602, a change in status of the array of computing elements 204 is predicted, such as by activity monitor 206 predicting a transition from an idle state to an active state, or transition from an active state to an idle state (or a transition to any other state) as discussed. In block 606 the frequency of the clock is selectively controlled to minimize, control, or limit $\Delta i/\Delta t$, such as by activity monitor 206 sending a control signal 210 to clock rate controller 208 to increase or decrease the frequency of processor 202 core clock. As discussed, the control signal 210 may also include an amount to increase/decrease the clock frequency as well as a number and/or size of steps to incrementally increase/decrease the clock frequency, FIG. 7 is a flowchart illustrating exemplary steps that may be performed by system 200 of FIG. 2 to implement aspects of the method 600 of FIG. 6. In particular, blocks 706-712 of FIG. 7 show exemplary steps for performing the selective clock frequency control of block 606 of FIG. 6. Method 700 begins with monitoring a compute array in block 702 (similar to block 602 of FIG. 6) and predicting a change in the status of the compute array in block 704 (similar to block 604 of FIG. 6).

If a prediction (such as by activity monitor 206) is made that the compute array is transitioning from active to idle (the NO branch of block 706) the frequency or rate of the core clock is incrementally decreased over a time interval, i.e., decremented, in block 708 (such as by clock rate controller 208) before the compute array transitions from the active state to the idle state. For example, the clock frequency may be decremented such that the clock frequency ramps down from an initial (higher) frequency to a target (lower) frequency. This incremental decrease in clock frequency ahead of the predicted transition to an idle state allows for control or limitation of the Δi/Δt caused by the compute array of computing elements 204 entering the idle state, before a stall can occur. The timing of when the frequency decrease begins, as well as the size and number of steps for the frequency decrease may be determined in an embodiment by the activity monitor 206 and implemented by the clock rate controller 208 via signals 212 to the processor 202 core clock.

On the other hand, if the prediction is made that the compute array is transitioning from to idle to active (the YES branch of block 706) the frequency or rate of the core clock is incrementally increased over a time interval, i.e., incremented, (such as by clock rate controller 208) in block 712. For example, the clock frequency may be incremented over a time interval such that the clock frequency ramps up from an initial (lower frequency to a target (higher) frequency. The clock frequency may be incremented beginning at the time the computer array is predicted to become active (i.e., predicted to begin to perform computations upon operands).

However, in some instances, before the clock frequency is increased in block 712, and before the compute array becomes active, the clock frequency may be initially decreased in block 710 (such as by clock rate controller 208). An example of such an instance is when operands are in the process of being fetched from a local memory or other memory into the processor 202, as it may be desirable for the fetching process to operate at a high clock rate. Accordingly, if the prediction is made (block 706) that the compute array is transitioning from idle to active, and if the clock frequency is already high (e.g., above a threshold) at the time the prediction is made, then the clock frequency may be initially decreased in block 710 while the compute array compute array is still idle before being increased in block 712 beginning at the time the compute array is predicted to begin activity.

This lowering of the clock frequency ahead of the predicted transition to an active state in block 710, followed by the incremental increase of clock frequency as the active state begins in block 712 allows for control or limitation of the Δi/Δt caused by the compute array (e.g., the array of computing elements 204) transitioning from an idle state to an active state. The timing of the initial clock rate/frequency decrease, as well as the size and number of steps for the subsequent clock rate/frequency increase, may be determined in an embodiment by the activity monitor 206 and implemented by the clock rate controller 208 via signals 212 to the processor 202 core clock.

In addition to, or as an alternative to, controlling the rate or frequency of the processor 202 core clock, other methods or systems may be implemented to control or limit the Δi/Δt from state transitions of a parallel compute array. Such state transitions may include active-to-idle, idle-to-active, or any other transition for which controlling or limiting Δi/Δt is desirable. As illustrated in FIGS. 3A-3D and FIG. 8, it is possible to control or limit Δi/Δt of a compute array of a parallel processor 302, by incrementally activating (or deactivating) portions of the array of computing elements 304.

Figure 8:
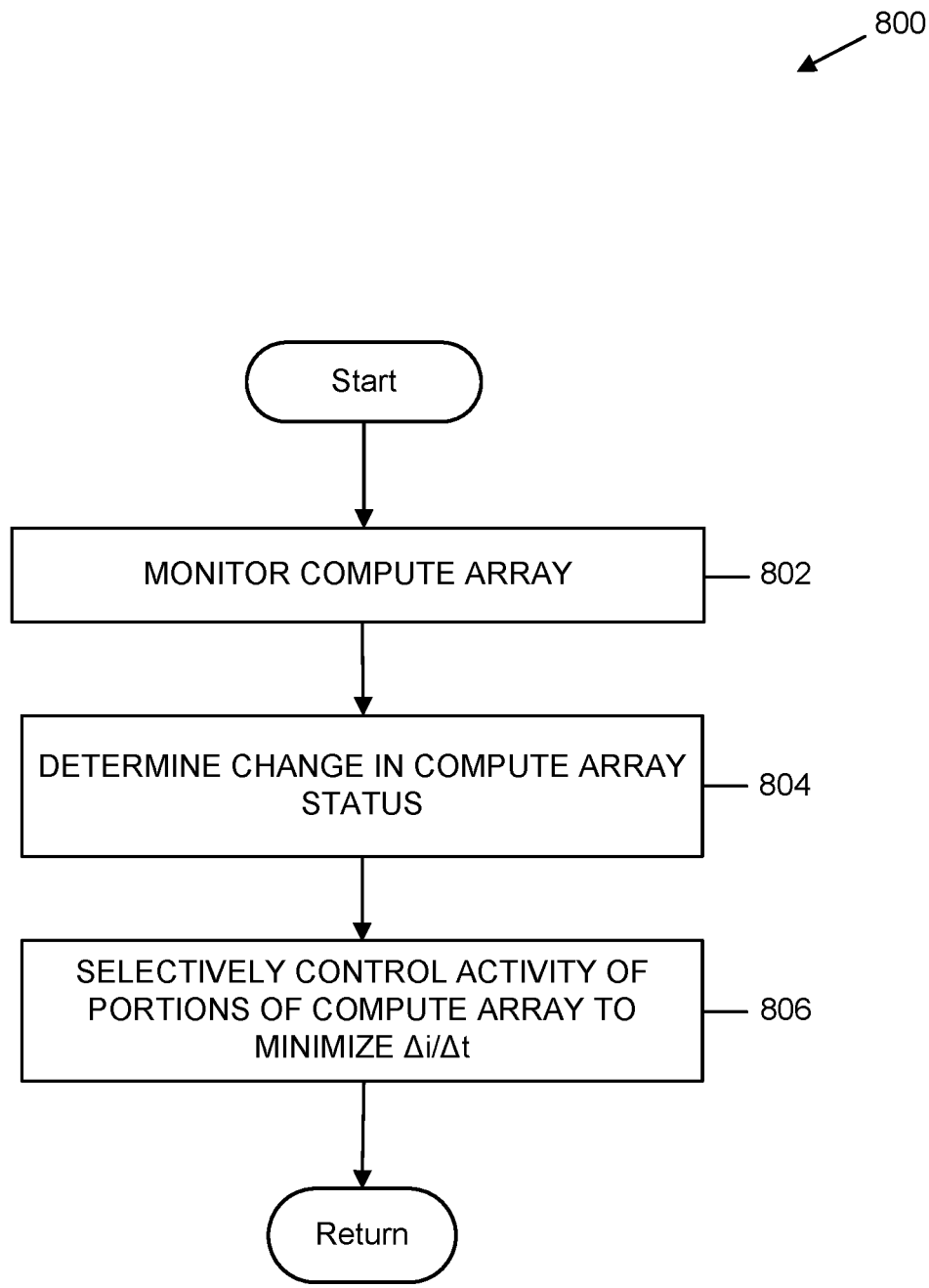
FIG. 8 is a flowchart illustrating another exemplary method for controlling; instantaneous current changes in a parallel processor.

One method 800 for such incremental activation or deactivation of portions of a compute array is illustrated in FIG. 8. Method 800 begins in block 802 with a monitoring of the compute array of a parallel processor (such as parallel processor 302 of FIG. 3). The monitoring of block 802 may comprise monitoring the status of the compute array such as by monitoring operand queue fill levels, result queue fill levels, or any other indicator of the state of the array. Based on the information monitored in block 802, a determination is made in block 804 that the computing elements 304 and/or array are transitioning from one state to another (e.g. active-to-idle, idle-to-active, etc.). The determination of block 804 does not necessarily require a prediction as in method 600 of FIG. 6, but may instead be based on the current measured state of the processor 302 or the array of computing elements 304. In block 806 the activity of portions of the compute array are selectively controlled in order to minimize the Δi/Δt.

Figure 3B:
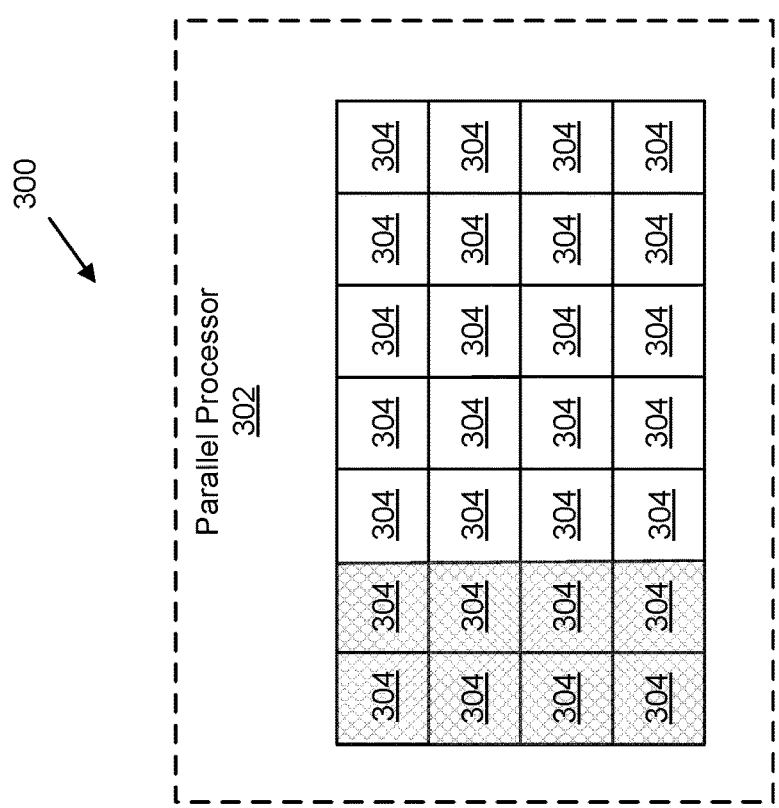
FIG. 3B is similar to FIG. 3A, showing a further portion of the computing elements in an active state.
Figure 3A:
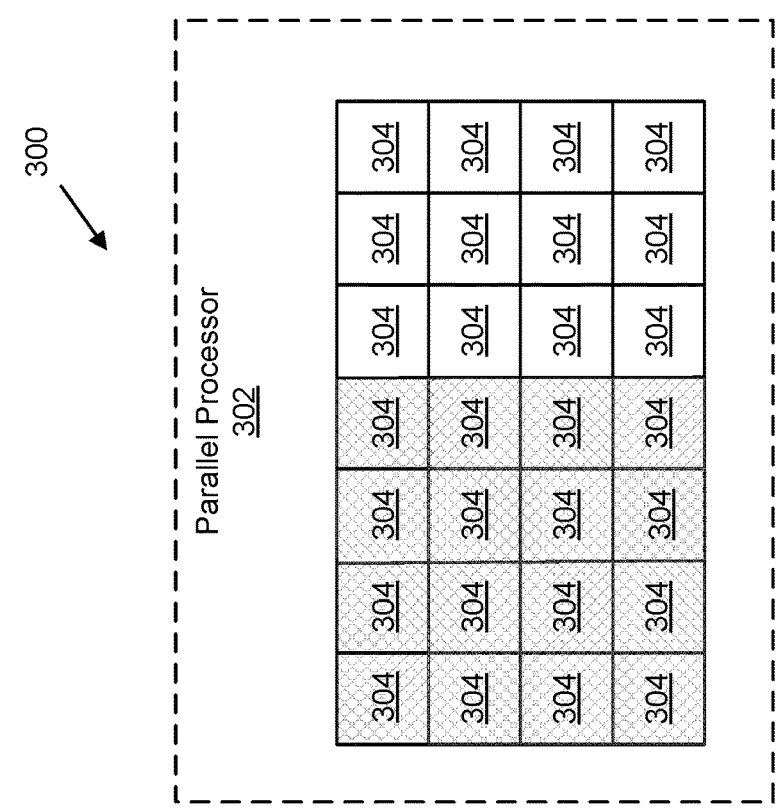
FIG. 3A is a block diagram illustrating selective activation of the computing elements in a parallel processor, showing a portion of the computing elements in an active state.

One example of the control of portions of the compute array of block 806 of FIG. 8 is illustrated in FIGS. 3A-3D. As shown in FIG. 3A when transitioning from active to idle in one embodiment a first portion (FIG. 3A) of the computing elements 304 (illustrated with cross hatching) of the array may be activated. The remaining computing elements 304 (illustrated with no cross hatching) of the array remain inactive initially. Then, as illustrated in FIG. 3B a second portion of the computing elements 304 (illustrated with cross hatching) may also be activated, while the remaining computing elements 304 (illustrated with no cross hatching) remain inactive. As illustrated in FIG. 3C, an additional portion of the computing elements 304 (illustrated with cross hatching) of the array may then be activated, etc., until the array is fully activated as illustrated in FIG. 3D.

Through this incremental or staggered activation of the computing elements 304, the Δi/Δt from the transition of the array of computing elements 304 to an active state may be controlled or limited without possible performance degradation from changing the processor 304 core clock frequency. Additionally, such staggered activation does not rely on predictions and avoids unnecessary changes/performance degradation caused by inaccurate predictions. As will be understood, deactivation of the computing elements 304 may also be staggered to achieve similar control or limitation of Δi/Δt from the transition of the array from an active state to an idle state (or transition to any other desired state).

Figure 4:
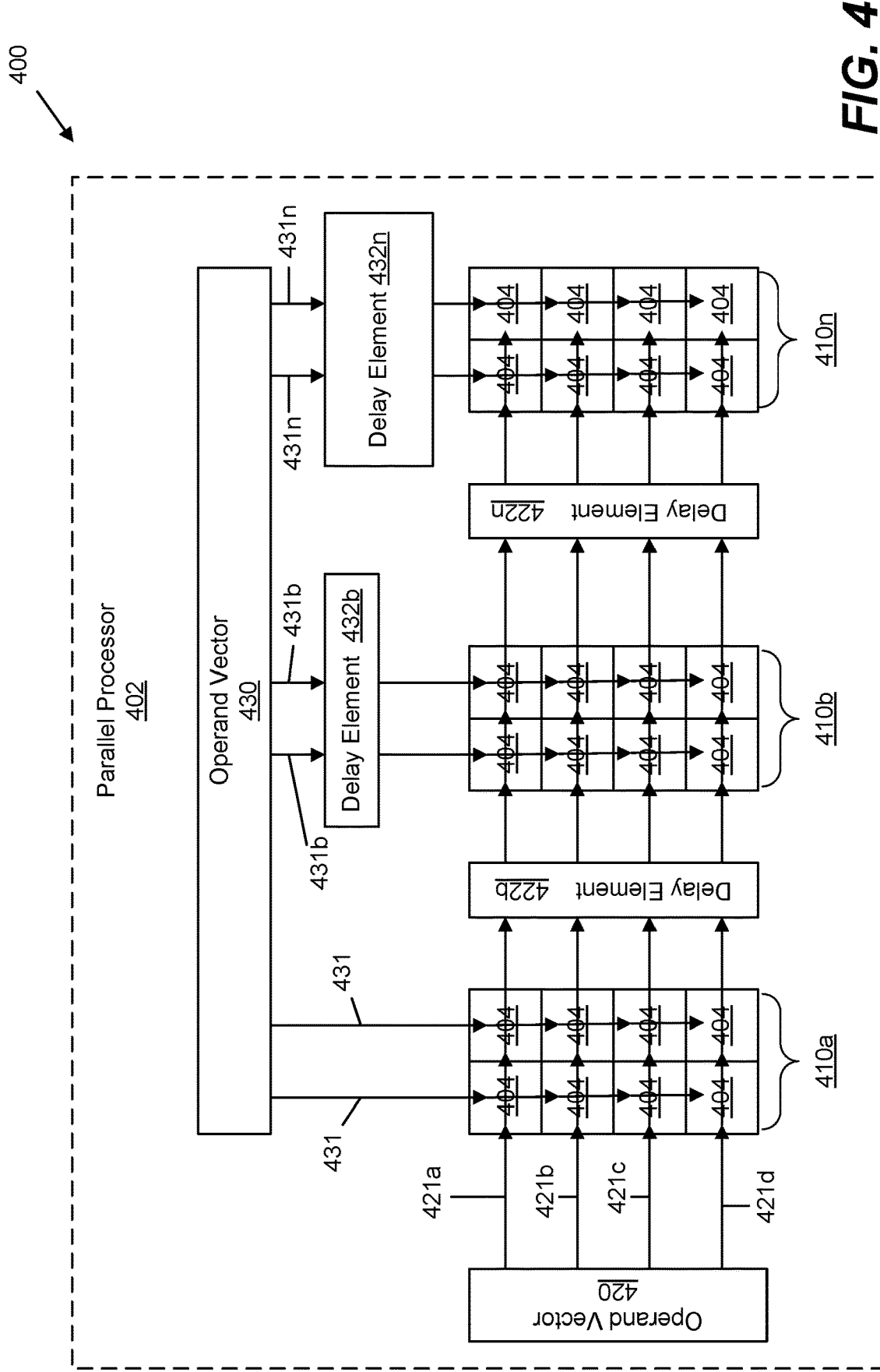
FIG. 4 is a block diagram illustrating operation of an embodiment of a system that allows for selective activation of the computing elements in a parallel processor as illustrated in FIGS. 3A-3D to control instantaneous current changes in a parallel processor.

FIG. 4 is a block diagram illustrating a first embodiment of a system 400 that allows for selective activation of the computing elements 404 in a parallel processor 402. The system 400 of FIG. 4 may be used to implement method 800 of FIG. 8 discussed above. Processor 402 of FIG. 4 includes an array of multiple computing elements 404 arranged in a parallel configuration, and able to independently execute. Although FIG. 4 illustrates a two-dimensional array of computing elements 404 for clarity, it will be understood that the array of computing elements 404 may be three-dimensional, with corresponding three-dimensional operand input to the array (and three-dimensional result output from the array). The system 400 and operation of the system 400 discussed herein are equally applicable to such three-dimensional arrays.

As illustrated, the array is functionally divided into multiple portions 410 consisting of groups of computing elements 404. As will be understood, portions 410 need not be physically separated from each either. Although only three portions 401*a*, 410*b*, and 410*n* are illustrated, it will be understood that any number of portions 410 may be implemented and the number of portions may vary depending on the number of computing elements 404. In FIG. 4 portion 410*n* is intended to illustrate the last or Nth portion 410 of the array where N is any integer. Additionally, it will be understood that each portion 410 may comprise fewer or more computing elements 404 than illustrated in FIG. 4 and that it is not necessary that each portion 410 contain the same number of computing elements 404.

As illustrated in FIG. 4, operand vectors 420 and 430 may be provided to each of computing elements 404 of the array. An operand vector 420 or 430 also may be referred to as an operand, as the constituent data elements of operand vector 420 and 430 are typically provided simultaneously (e.g., during a single clock cycle) to all of the computing elements 404 of an array. However, as shown in FIG. 4, system 400 allows for operands to be delayed for some portions 410 of the array. This delay allows for staggered activation/deactivation of the computing elements 404 (like that illustrated in FIGS. 3A-3D) in order to control or limit $\Delta i/\Delta t$.

FIG. 4 illustrates the operation of exemplary system 400 during a transition of processor 402 and/or the array of computing elements 404 from an idle state to an active state. Once the data or operands for execution by the computing elements 404 are received, operand vectors 420 and 430 begin providing the operands as in normal operation. However, because the array of computing elements 404 has just transitioned to an active state, the operands in system 400 are only initially provided to a first portion 410a of computing elements 404. The operands for a second portion 410b, third portion, fourth portion, etc. to the final Nth portion 410n are delayed by delay elements 422b/432b and 422n/432n. This delay of the operands to portions 410b-401n results in the computing elements 404 for those portions 410b-410n remaining inactive as those computing elements 404 have no data on which to operate.

Then, after a period of time the operands for portion 410b are provided to portion 410b. As a result, the computing elements 404 of portion 410b become active along with the computing elements 404 of the first portion 410a, while the computing elements 404 of the remaining N portions 410n are still inactive as their operands remain delayed, such as by delay element 432n, After subsequent periods of time, the operands for the remaining N portions 410n are provided to the portion(s) 410n resulting in incremental activation of the computing elements 404 of those portion(s) 410n. In some embodiments delay elements 422 and 432 may remain active and operate to delay operands the entire time that the array is active. In other embodiments, once all of the portions 410a-410n have been incrementally activated, the delay elements 422 and 432 may be deactivated or bypassed such that the operands are provided to all of the portions 410a-410n.

Controlling the provision of the operands with the delay elements 422/432 results in an incremental or staggered activation of portions 410a-410n (since the computing elements 404 of each portion 410 remain idle until provided operands or data to act on) which in turn allows system 400 to limit or control the $\Delta i/\Delta t$ from the transition of the array from an idle state to an active state. As will be understood, the same is also true for a transition of the array from an active state to an idle state.

Because the operands for the various portions 410a-410n are initially delayed for some portions (410b-410n), the outputs from the computing elements 404 for the delayed portions (410b-410n) will likewise also be delayed. In other words, while the portions 410b-410n are incrementally activated by delaying the operands, the output from the compute array as a whole will be initially misaligned or staggered in time. The timing of these "misaligned" outputs from the computing elements 404 may be "re-aligned" or matched back up in time by any desired means.

For example, in an embodiment the outputs may be re-aligned or matched up by initially buffering the outputs of the various portions 410a-410b until all of the portions 410 have been activated. As will be understood, such the length of time the output of each portion 410 is buffered will vary inversely with the amount of time the operands for that portion 410 was delayed. For another example, the outputs of the various portions 410a-410n may be written to specific memory addresses in a manner that accounts for the delayed operands to ensure that the timing of the outputs of the computing elements 404 is "re-aligned" or matched back up.

Delay elements 422 and 432 may comprise one or more buffers and/or logic configured to release the operands to the various portions 410b-410n at predetermined increments of time. In various embodiments, the time increment may be fixed or may be variable/programmable if desired. Although delay elements 432b-432n are illustrated as separate elements, they may be one element 432 configured to provide operands to portions 410b-410n after predetermined time increments. Additionally, delay element 432 may comprise multiple different "stacked" delay elements 432b-432n (not illustrated) such that the operands for portion 410b are only delayed by delay element 432b, while the operands for portion 410n are delayed first by delay element 432b and then by delay element 432n to achieve the incremental activation of portions 410b and 410n. The same is also true for delay elements 422b-422n.

Figure 9:
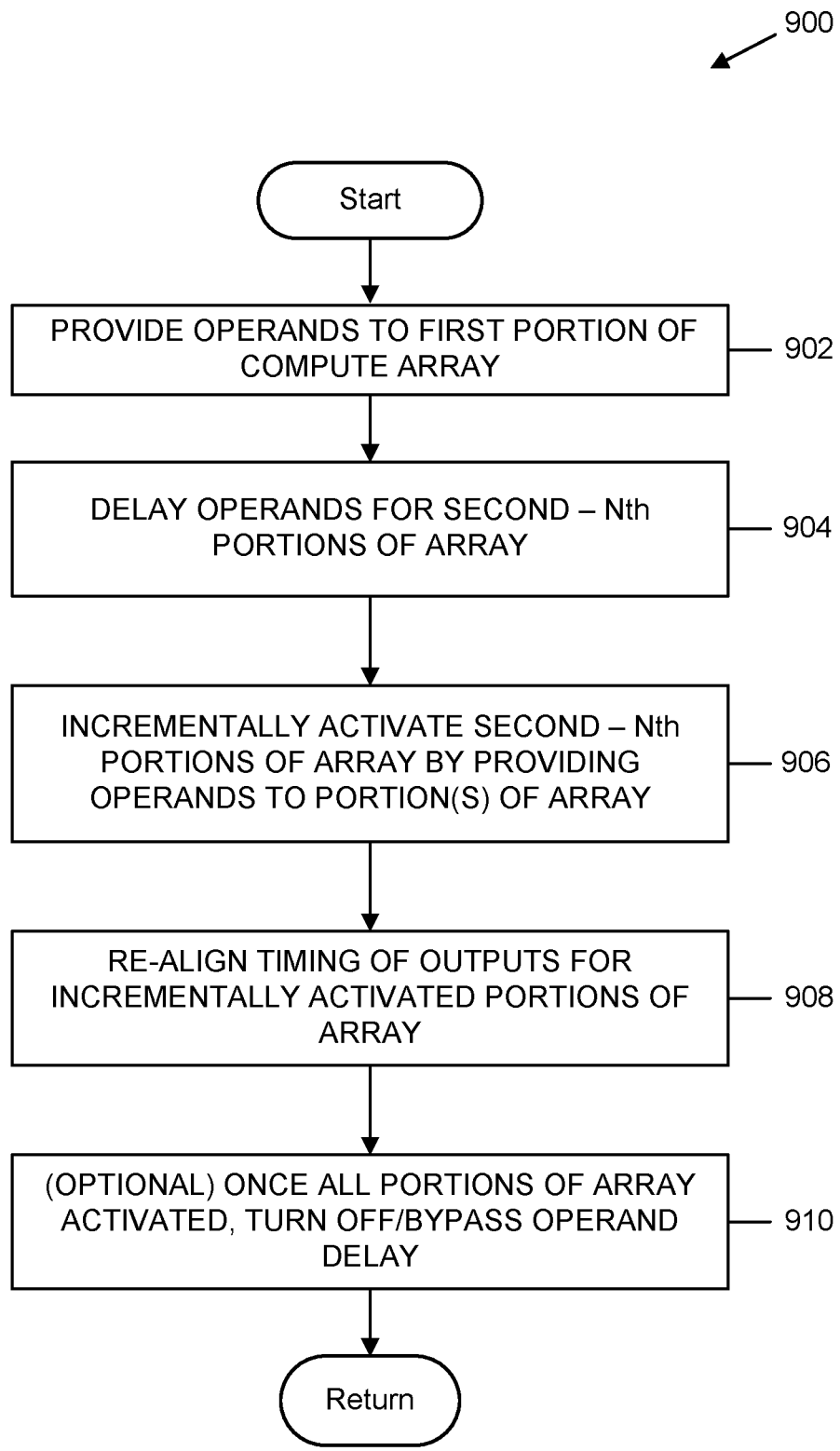
FIG. 9 is a flowchart illustrating a first embodiment of exemplary steps that may be performed to implement aspects of the method of FIG. 8.

Turning to FIG. 9 a flowchart of exemplary steps that may be performed to implement block 806 of method 800 using a system such as system 400 of FIG. 4. FIG. 9 illustrates steps that may be taken to selectively control the activity of portions of a compute array when the array is transitioning from an idle state to an active state. In block 902 a first portion 410a of the array is activated by providing operands to the computing elements 404 of that portion 410a of the array. In block 904, operands for the remaining second—Nth portions (e.g. 410b-410n) of the array are delayed, such as by delay elements 432 and 422, resulting in those portions 410b-410n initially remaining inactive.

Continuing to block 906, the second—Nth portions (410b-410n) are incrementally activated by providing operands to the computing elements 404 of each of the remaining second—Nth portions (410b-410n) in turn. In this manner, the computing elements 404 of the array can be brought from idle to active in staggered fashion, minimizing or controlling the $\Delta i/\Delta t$. In block 908 the outputs of the computing elements 404 of the incrementally activated portions of the array are placed back in order or matched up as discussed above. In embodiments where delay elements 422 and 432 remain active and operate to delay operands the entire time that the array is active, method 900 may skip block 910 and return after block 908. In other embodiments, method 900 may continue to block 910 where, once all of the portions 410 of the array have been activated, the operands are no longer delayed for any portion in block 910 by turning off or otherwise bypassing the delay elements 422/432.

Figure 5:
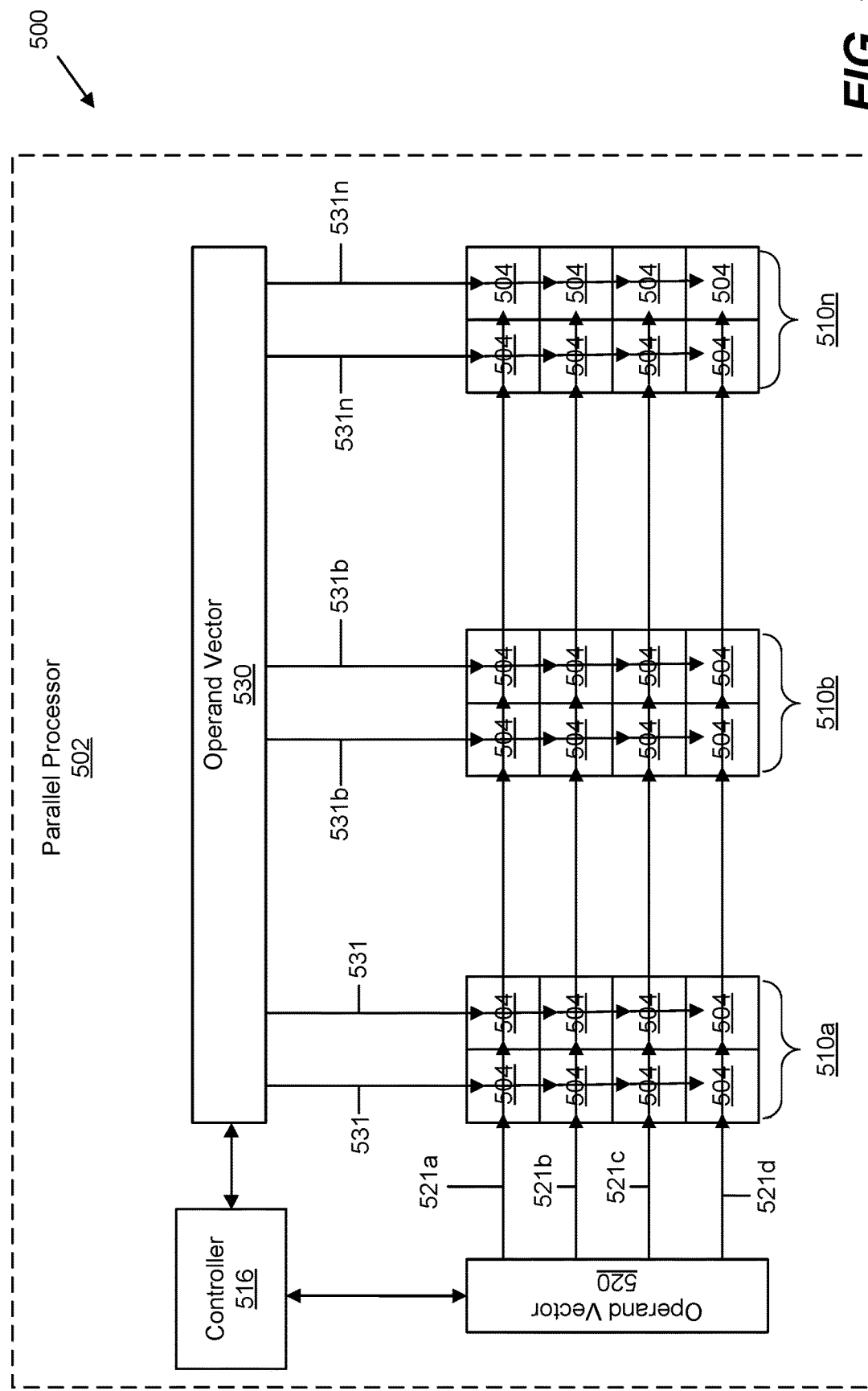
FIG. 5 is a block diagram illustrating operation of another embodiment of a system that allows for selective activation of the computing elements in a parallel processor as illustrated in FIGS. 3A-3D to control instantaneous current changes in a parallel processor.

A second embodiment of a system 500 that allows for selective activation of the computing elements 504 in a parallel processor 502 is illustrated in FIG. 5. The system 500 of FIG. 5 may also be used to implement method 800 of FIG. 8 discussed above. System 500 is similar to system 400 discussed above in that processor 502 of FIG. 5 includes an array of multiple computing elements 504 arranged in a parallel configuration, and able to independently execute. Although FIG. 5 illustrates a two-dimensional array of computing elements 504 for clarity, it will be understood that the array of computing elements 504 may be three-dimensional, with a corresponding three-dimensional operand input to the array (and three-dimensional results output from the array). The system 500 and operation of the system 500 discussed herein are equally applicable to such three-dimensional arrays.

As illustrated, the array is functionally divided into multiple portions 510 consisting of groups of computing elements 504. As will be understood, portions 510 need not be physically separated from each either. Although only three portions 510a, 510b, and 510n are illustrated, it will be understood that any number of portions 510 may be implemented and the number of portions may vary depending on the number of computing elements 504. In FIG. 5 portion 510n illustrates the last or Nth portion 510 of the array where N is any integer. It will also be understood that each portion 510 may comprise fewer or more computing elements 504 than illustrated in FIG. 5 and that it is not necessary that each portion 510 contain the same number of computing elements 504.

As illustrated in FIG. 5, operand vectors 520 and 530 operate to provide operands to each of computing elements 504 of the array. In system 500 the operands are provided simultaneously to all of the computing elements 504. However, unlike system 400 of FIG. 4, system 500 does not use delay elements (like 432/422 in FIG. 4) to delay operands for various portions 410 of the array. Instead, system 500 initially denies the operands from the computing elements 504 of all portions 510 of the array, while incrementally activating the portions 510. To accomplish this, the computing elements 504 of system 500 are configured to also operate on/execute "dummy operands" using similar amounts of power used by the computing elements 504 when performing the actual operations on "real operands."

Figure 10:
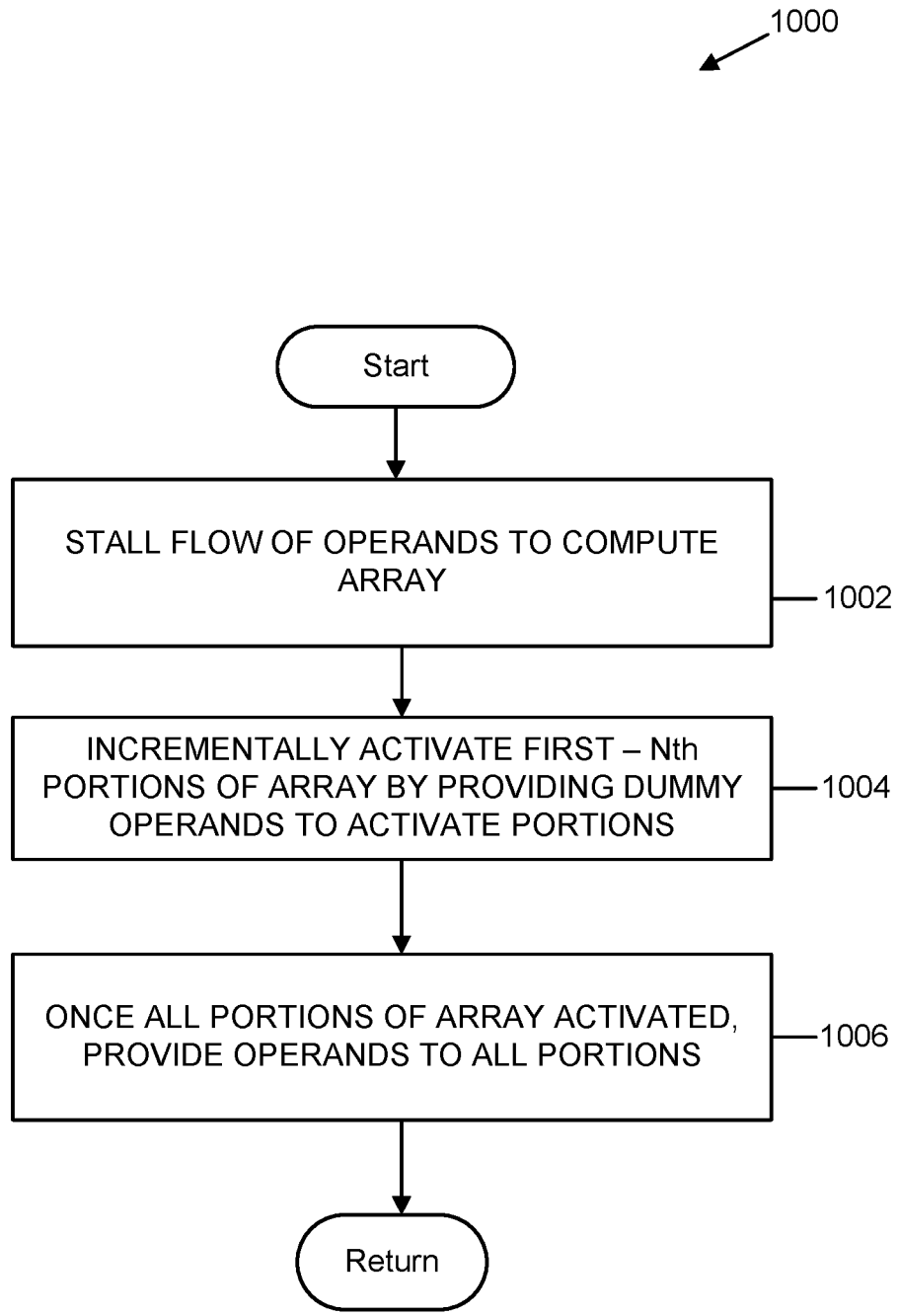
FIG. 10 is a flowchart illustrating a second embodiment of exemplary steps that may be performed to implement aspects of the method of FIG. 8.

System 500 also includes controller 516, which in an embodiment may be implemented as hardware such as a state machine. In an embodiment, controller 516 may operate to perform the monitoring functions of block 802 and determining state change of block 804 of method 800 (FIG. 8) discussed above. In other embodiments, another component of system 500 may perform those blocks of method 800. Controller 516, either alone or in conjunction with other components of system 500 may perform block 806 of method 800 (FIG. 8). For example, turning to FIG. 10 a flowchart of exemplary steps that may be performed by controller 516 to implement block 806 of method 800. FIG. 10 illustrates steps that may be taken to selectively control the activity of portions of a compute array when the array is transitioning from an idle state to an active state.

Regardless of how determined, when a state transition for the array of computing elements 504 from idle-to-active occurs in system 500, in block 1002 of FIG. 10 the controller 516 causes the flow of all operands from operand vector 530 and 520 to be stalled such that none of the operands are provided or presented to the array, such as via a queue, buffer, or other means. In block 1004, controller 516 causes portions 510a-510n to incrementally activate by first providing "dummy operands" first to the computing elements 504 of portion 510a only. Then controller 516 also provides dummy operands to the computing elements 504 of portion 510b to also activate portion 510b along with portion 510a, while keeping the computing elements 504 of the rest of the portion(s) 510n idle. This incremental activation of portions 510 in block 1004 continues until dummy operands have been provided in turn to the computing elements 504 of all portions 510a-510n. Once dummy operands have been provided to all portions 510a-510n, the array of computing elements 504 is fully activated. In block 1006 of FIG. 10 the "real operands" from operand vectors 520 and 530 are then provided to the computing elements of all of portions 510a-510n.

The operation by the computing elements 504 on the dummy operands consumes similar amounts of power to that used by the computing elements 504 when performing operations on "real operands." Thus, the incremental provision of dummy operand; to portions 510a-510n (while delaying the real operands) results in a staggered activation of the array of computing elements 504, minimizing or controlling the $\Delta i/\Delta t$ from the transition of the array from an idle state to an active state. Then once the array is fully active, the "real operands" can be provided to the computing elements 504 without any need to match up or re-order any outputs from the computing elements 504—the outputs of the computing elements from the operation on the dummy operands are simply disregarded or not recorded.

Similarly, when the array transitions from active to idle, the controller 516 of system 500 also employs dummy operands to stagger or increment the ramp down of activity by the array. For example, in an embodiment at the point the array is to transition from an active state to an idle state (such as from lack of data or operands from the operand vectors 520/530) controller may instruct all of the compute elements 504 to perform operations on dummy operands. The output of such dummy operations is ignored or not recorded. Then the controller incrementally decreases the number of compute elements 504 performing the dummy operations, such as by incrementally idling portions 510a-510n by shutting off the supply of dummy operands to the portions 510a-510n in turn until the entire array is idle. This incremental idling of computing elements 504, such as by ceasing the flow of dummy operands to portions 510a-510n in turn results in a staggered idling of the array, again minimizing or controlling the $\Delta i/\Delta t$ from the transition of the array from an active state to an idle state.

Figure 11:
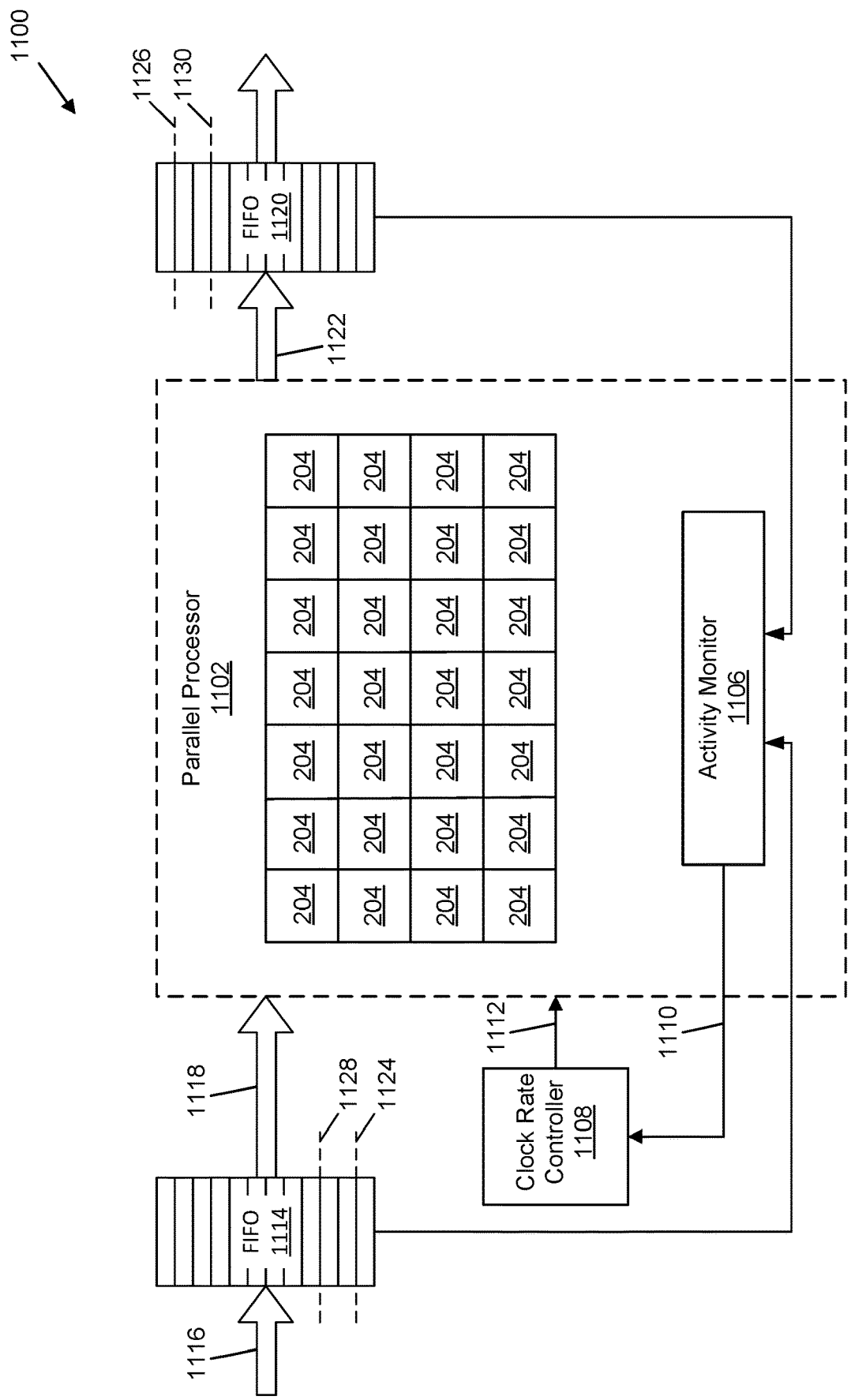
FIG. 11 is a block diagram of another embodiment of a system that allows for controlling instantaneous current changes in a parallel processor.

FIG. 11 is a block diagram of an embodiment of a system 1100 that allows for controlling $\Delta i/\Delta t$ in a parallel processor 1102. For brevity, portions of system 1100 that are similar to corresponding portions of above-described system 200 (FIG. 2) are not described in similar detail. Such portions include parallel processor 1102, which may be similar to above-described parallel processor 202. Such portions may also include a clock rate controller 1108, which may be similar to above-described clock rate controller 208.

System 1100 may include an input FIFO buffer 1114 configured to buffer an incoming stream 1116 of operands. The FIFO buffer 1114 provides a buffered stream 1118 of operands to parallel processor 1102. System 1100 may also include an output FIFO buffer 1120 configured to buffer the outgoing stream 1122 of results produced by the array of computing elements 204 using the operands. The results may then be streamed from the output FIFO buffer 1120 to a destination, such as an executing application. An activity monitor 1106 is configured to predict or determine an upcoming transition of processor 202 and/or array of computing elements 204 from the active state to the idle state and from the idle state to the active state.

The activity monitor 1106 may be configured to monitor an input FIFO idle threshold 1124 and output FIFO idle threshold 1126 and compare them with the fill levels of the input FIFO 1114 and output FIFO 1120, respectively. When the activity monitor 1106 determines that the fill level of the input FIFO 1114 falls below the input FIFO idle threshold 1124, the activity monitor 206 predicts an upcoming array stall (i.e. that the array of computing elements 204 will transition from an active state to an idle state). Similarly, when the activity monitor 1106 determines that the fill level of the output FIFO 1120 rises above the output FIFO idle threshold 1126, the activity monitor 206 predicts an upcoming array stall.

The above-described control method by which the activity monitor 206 predicts an upcoming array stall may include hysteresis. For example, the activity monitor 1106 may further be configured to monitor an input FIFO active threshold 1128 and an output FIFO active threshold 1130 and compare them with the fill levels of the input FIFO 1114 and output FIFO 1120, respectively. When the activity monitor 1106 determines that the fill level of the input FIFO 1114 rises above the input FIFO active threshold 1128, the activity monitor 206 removes or ceases to issue the prediction of an upcoming array stall. Similarly, when the activity monitor 1106 determines that the fill level of the output FIFO 1120 falls below the output FIFO active threshold 1130, the activity monitor 206 removes or ceases to issue the prediction of an upcoming array stall. In embodiments in which such hysteresis is not included, the activity monitor may remove or cease to issue the prediction of an upcoming array stall when the activity monitor 1106 determines that the fill level of the input FIFO 1114 rises above the input FIFO idle threshold 1124 and remove or cease to issue the prediction of an upcoming array stall when the activity monitor 1106 determines that the fill level of the output FIFO 1120 falls below the output FIFO idle threshold 1126. That is, in embodiments that do not include hysteresis, input FIFO active threshold 1128 and output FIFO active threshold 1130 are neither provided nor monitored. The activity monitor 1106 may provide the result of the prediction to the clock rate controller 1108 in the same form and manner described above with regard to the activity monitor 202 (FIG. 2).

Activity monitor 1106 may also be configured to determine a transition of processor 202 and/or array of computing elements 204 from the idle state to the active state. The array of computing elements 204 is idle in response to not being provided with operands. Thus, the array of computing elements 204 will be idle if the input FIFO 1114 is empty or the output FIFO 1120 is full. Activity monitor 1106 may be configured to issue an indication of an idle-to-active transition when it determines the input FIFO 1114 is empty or the output FIFO 1120 is full. Note that this is more aptly characterized as an indication or determination rather than a prediction. The array of computing elements 204 becomes active in response to parallel processor 1102 beginning to receive the buffered stream 1118 of operands.

FIGS. 12A-12B illustrate a method by which activity monitor 206 (FIG. 2) may predict a transition of the array of computing elements 204 from an active state to an idle state in embodiments in which the order in which the operands are fetched is not necessarily the order in which the fetched operands are then presented to the array of computing elements 204. For example, the array of computing elements 204 may be three-dimensional, and the operands are fetched from a random-access system memory 1202. As illustrated in FIG. 12A, the system memory 1202 (or portion thereof) may be configured to serve as a source of three-dimensional operand blocks 1204. That is, multiple operand blocks 1204 may initially be stored in such a system memory 1202 or a portion thereof configured to store operand blocks 1204 in a three-dimensional format. As indicated by arrows 1206, operand blocks 1204 may be read out of system memory 1202 and streamed into a local memory 1208. The local memory 1208 may be part of the processor 202 (FIG. 2) or located in close proximity thereto.

Each operand block 1204 may comprise operands 1210 organized in a three-dimensional array format. The next operand block 1204 in the stream may be read out of system memory 1202 and stored in the local memory 1208. The operands 1210 of an operand block 1204 may then be read out of the local memory 1208 and provided to the array of computing elements 204 (FIG. 2), as indicated by the arrow 1212. The order in which the operands 1210 are read out of the local memory 1208 and streamed to the array of computing elements 204 may differ from the order in which the operands 1210 were read out of the system memory 1202 and streamed to the local memory 1208. While the array of computing elements 204 is operating on a previous operand block 1204, the next operand block 1204 may be read out of the system memory 1202 and streamed into the local memory 1208. The local memory 1208 may have a format in which coordinates or indices may be used to identify the locations in which the operands 1210 are stored in three dimensions, X, Y, and N. Indices in the X, Y, and N dimensions are represented in the formula below (and in FIG. 12B) as xx, yy, and nn, respectively.

As illustrated in FIG. 12B, the operands 1210 of an operand block 1204 stored in the local memory 1208 may be read or streamed from the local memory 1208 to the array of computing elements 204 (FIG. 2) using logic in the form of nested loops. Pseudocode representing such nested-loop logic may include three nested loops, each associated with one of the dimensions. For example, the innermost loop may iterate through the N dimension, a middle loop may iterate through the Y dimension, and an outermost loop may iterate through the X dimension. In the innermost loop, the array of computing elements 204 may compute a result based on the current operand 1210, which may be identified by the set of location indices (xx,yy,nn). In this manner, the array of computing elements 204 traverses an operand block 1204 stored in the local memory 1208. While the array of computing elements 204 is traversing that (current) operand block 1204, the next operand block 1204 may be read into the local memory 1208 from the system memory 1202. In some instances, such a next operand block 1204 will not have been read into the local memory 1208 at the time the array of computing elements 204 has almost completed traversing the current operand block 1204. Whether the array of computing elements 204 has almost completed traversing the current operand block 1204 may be defined, for example, by the following formula:

$$\text{almost\_complete} = ((X-xx) < x\_\text{threshold}) \text{ AND } ((Y-yy) < y\_\text{threshold}) \text{ AND } ((N-nn) < n\_\text{threshold})$$

where X, Y and N represent the maximum indices in the X, Y, and N dimensions, respectively, and where x_threshold, y_threshold, and n_threshold are index thresholds in the X, Y, and N dimensions, respectively.

Thus, the location of a current operand 1210 being provided to and acted upon by the array of computing elements 204 is compared with a three-dimensional threshold. Stated more generally, the location of a current operand 1210, as represented in a reference system having three or more indices, is compared with a threshold in the reference system. If the comparison indicates that the location of the current operand 1210 is within that threshold, the array of computing elements 204 has almost completed being provided with the current operand block 1204. That is, the array of computing elements 204 has almost completed traversing or consuming the current operand block. If a next operand block 1204 has not been read into the local memory 1208 at the time the array of computing elements 204 has almost completed traversing the current operand block 1204, activity monitor 206 (FIG. 2) may issue a prediction of a transition of the array of computing elements 204 from active to idle. In response to such a prediction of an active-to-idle transition, the clock frequency may be ramped down in the manner described above.

1210 an operand—this is what will be presented to the compute array as an atomic unit in a single processing cycle (e.g. 1210 is equivalent to operand vectors 420 and 430 in FIG. 4—and referring to our specific implementation, typically 420 is provided from a 3D block of operands as shown in FIG. 12A and 430 from a 4D block of operands, similar to FIG. 12A but with an additional dimension).

Systems 200 (FIG. 2), 400 (FIG. 4), 500 (FIG. 5), and/or 1100 (FIG. 11), as well as methods 600 (FIG. 6), 700 (FIG. 7), 800 (FIG. 8), 900 (FIG. 9), 1000 (FIG. 10), and/or 1200 (FIG. 12) may be incorporated into or performed by any desired computing system, whether such computing system is a stand-alone computing system or is a portion or component of an apparatus or machine. For example, parallel processors 202 (FIG. 2), 302 (FIGS. 3A-4D), 402 (FIG. 4), 502 (FIG. 5) and/or 1101 (FIG. 11) may be, or may be part of a system-on-a-chip that may comprise a multicore CPU, a graphics processing unit (GPU), an analog processor, and/or other components including memory, a communication bus, additional controllers, power supply, etc. that are not illustrated in the figures.

It should also be appreciated that one or more of the method steps described herein may be stored in the memory as computer program instructions. These instructions may be executed by any suitable processor in combination or in concert with the corresponding components described in the figures to perform the methods described herein. Certain steps in the processes or process flows described in this specification naturally precede others for the invention to function as described.

However, the disclosure is not limited to the order of the steps or blocks described if such order or sequence does not alter the functionality. That is, it is recognized that some steps or blocks may performed before, after, or parallel (substantially simultaneously with) other steps or blocks. In some instances, certain steps or blocks may be omitted or not performed without departing from the invention. Further, words such as "thereafter", "then", "next", etc. are not intended to limit the order of the steps. Additionally, one of ordinary skill in programming is able to write computer code or identify appropriate hardware and/or circuits to implement the disclosed systems and methods without difficulty based on the flow charts and associated description in this specification, for example.

Therefore, disclosure of a particular set of program code instructions or detailed hardware devices is not considered necessary for an adequate understanding of how to make and use the disclosed systems and methods. The functionality of the claimed computer implemented processes is explained in more detail in the above description and in conjunction with the figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for controlling an instantaneous current change in a parallel processor, the method comprising:
   monitoring an array of computing elements of the processor, the computing elements configured to operate independently of each other in parallel;
   determining a transition from a first activity level of the array to a second activity level of the array; and
   selectively controlling the array to minimize the instantaneous current change from the transition from the first activity level to the second activity level; wherein selectively controlling the array comprises controlling a frequency of a core clock for the processor; and controlling the frequency of the core clock comprises first decreasing the frequency of the core clock and then incrementally increasing the frequency of the core clock; and the first activity level is an idle state and the second activity level is an active state.

2. The method of claim 1, wherein:
   determining the transition comprises predicting a future change from the first activity level to the second activity level.

3. The method of claim 1, wherein:
   determining the transition comprises determining a present change from the first activity level to the second activity level;
   the array comprises a plurality of portions, each portion comprising a set of the computing elements; and
   selectively controlling the array comprises incrementally transitioning each of the plurality of portions of the array from the first activity level to the second activity level until all of the plurality of portions are in the second activity level.

4. The method of claim 3, wherein:
   transitioning each of the plurality of portions of the array from the first activity level to the second activity level comprises providing operands to the computing elements of one or more of the plurality of portions of the array, the operands causing the computing elements to execute.

5. The method of claim 4, wherein the operands causing the computing elements to execute are dummy operands for which no output is recorded, the method further comprising:

once all of the plurality of portions of the array are in the second activity level, providing real operands to all of computing elements of the array.

6. The method of claim 4, wherein the operands causing the computing elements to execute are real operands, the method further comprising:
delaying the real operands for the portions of the array which have not transitioned to the second activity level; and
re-aligning the timing of the outputs of the computing elements of the portions of the array.

7. A system for controlling an instantaneous current change in a parallel processor, the system comprising:
an array of computing elements of the processor, the computing elements configured to operate independently of each other in parallel;
a controller configured to determine a transition from a first activity level of the array to a second activity level of the array; and
the controller configured to control the array to minimize the instantaneous current change from the transition from the first activity level to the second activity level; the controller further comprises a clock rate controller configured to control the frequency of a core clock of the processor; the clock rate controller is further configured to first decrease the frequency of the core clock and then incrementally increase the frequency of the core clock, wherein the first activity level is an idle state and the second activity level is an active state.

8. The system of claim 7, wherein:
the controller comprises an activity monitor configured to predict a future change from the first activity level to the second activity level.

9. The system of claim 7, wherein:
the controller is configured to determine the transition by determining a present change from the first activity level to the second activity level;
the array comprises a plurality of portions, each portion comprising a set of the computing elements; and
the controller is configured to incrementally transition each of the plurality of portions of the array from the first activity level to the second activity level until all of the plurality of portions are in the second activity level.

10. The system of claim 9, wherein:
the controller is further configured to incrementally transition each of the plurality of portions of the array from the first activity level to the second activity level by providing operands to the computing elements of one or more of the plurality of portions of the array, the operands causing the computing elements to execute.

11. The system of claim 10, wherein:
the operands causing the computing elements to execute are dummy operands for which no output is recorded; and
the controller is further configured to cause real operands to be provided to all of the computing elements of the array once all of the portions of the array are in the second activity level.

12. The system of claim 10, wherein the operands causing the computing elements to execute are real operands, the system further comprising:
one or more delay elements configured to delay providing the real operands for the portions of the array which have not transitioned to the second activity level; and
an output element configured to re-align the timing of the outputs of the computing elements of the portions of the array while portions of the array have not transitioned to the second activity level.

13. The system of claim 7, wherein the parallel processor is a neural processor.

14. A system for controlling an instantaneous current change in a parallel processor, the system comprising:
an array of computing elements of the processor, the computing elements configured to operate independently of each other in parallel;
a local memory coupled to the array of computing elements, the local memory configured to buffer a stream of operands provided to the array of computing elements; the local memory is configured to receive a plurality of operands in an order different from an order in which the local memory provides the plurality of operands to the array of computing elements; and
a controller configured to determine, based on movement of the operands through the local memory, a transition from a first activity level of the array to a second activity level of the array; the controller is configured to control the array to minimize the instantaneous current change from the transition from the first activity level to the second activity level, the controller further comprises: an activity monitor which detects the first activity and second activity levels of the array, and a clock rate controller; the clock rate controller configured to control the frequency of a core clock of the processor.

15. The system of claim 14, wherein:
the local memory comprises an input first-in first-out (FIFO) buffer configured to store the operands; and
the activity monitor is configured to predict a future change from the first activity level to the second activity level based on a fill level of the input FIFO buffer.

16. The system of claim 15, wherein:
the first activity level is an active state and the second activity level is an idle state; and
the activity monitor is configured to cause the clock rate controller to incrementally decrease the frequency of the core clock in response to a prediction of a transition from the active state to the idle state.

17. The system of claim 16, further comprising an output FIFO buffer configured to store results provided by the array of computing elements, wherein the activity monitor is configured to predict a future change from the active state to the idle state when a fill level of the input FIFO buffer decreases below a first threshold or when a fill level of the output FIFO buffer increases above a second threshold.

18. The system of claim 14, wherein:
the activity monitor is configured to predict a future change from the first activity level to the second activity level based on a comparison of a location in a reference system having three or more indices of a current operand provided to the array with a threshold in the reference system.

19. The system of claim 18, wherein:
the first activity level is an active state and the second activity level is an idle state; and
the activity monitor is configured to cause the clock rate controller to incrementally decrease the frequency of the core clock in response to a prediction of a transition from the active state to the idle state.

20. The system of claim 19, wherein the activity monitor is configured to predict a future change from the active state to the idle state when the comparison indicates a current operand block in the local memory is within a threshold of being completely provided to the array and a next operand block is not present in the local memory.

21. The system of claim 14, wherein the parallel processor is a neural processor.

\* \* \* \* \*